(12) United States Patent
Jessberger et al.

(10) Patent No.: US 6,341,589 B1
(45) Date of Patent: Jan. 29, 2002

(54) SWITCHING UNIT

(75) Inventors: Thomas Jessberger, Rutesheim; Armin Ludmann, Gerlingen; Helmut Neuschwander, Ludwigsburg, all of (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/696,678

(22) Filed: Oct. 26, 2000

(30) Foreign Application Priority Data

Oct. 26, 1999 (DE) .......................... 199 51 412

(51) Int. Cl.⁷ .............................................. F02M 35/10
(52) U.S. Cl. ............................ 123/184.53; 123/184.56
(58) Field of Search ...................... 123/184.53, 184.56, 123/432

(56) References Cited

U.S. PATENT DOCUMENTS

| | | | | |
|---|---|---|---|---|
| 4,519,363 A | * | 5/1985 | Bernardoni et al. | 123/432 |
| 4,703,734 A | * | 11/1987 | Aoyama et al. | 123/432 |
| 4,765,297 A | * | 8/1988 | Richter | 123/432 |
| 4,834,048 A | * | 5/1989 | Adamis et al. | 123/432 |
| 4,932,378 A | * | 6/1990 | Hitomi et al. | 123/432 |
| 5,009,200 A | * | 4/1991 | Van Basshuysen et al. | 123/184.56 |
| 5,239,960 A | * | 8/1993 | Sasaki et al. | 123/432 |
| 5,696,318 A | | 12/1997 | Ernst et al. | 123/432 |
| 5,711,261 A | * | 1/1998 | Gambardella | 123/184.53 |

* cited by examiner

*Primary Examiner*—Marguerite McMahon
(74) *Attorney, Agent, or Firm*—Crowell & Moring LLP

(57) ABSTRACT

A switching unit 10 for closing inlet passages 11 in an air intake system having a plurality of inlet passages 11 arranged side by side in an internal combustion engine. The switching unit 10 comprises one switched and one unswitched flow cross section 20 for each cylinder of the internal combustion engine, flap valves 12 and a shaft 27. The switched flow cross sections 20 can be closed and opened by flap valves 12 which are operated with the shaft 27, which is outside of the unswitched flow cross sections.

22 Claims, 3 Drawing Sheets

SWITCHING UNIT

BACKGROUND OF THE INVENTION

The invention relates to a switching element for an air intake system of an internal combustion engine.

It is known that at the start of an intake stroke in the air intake system of an internal combustion engine, a vacuum wave is produced which moves upstream in the air intake system. At an end open to the atmosphere or to a buffer provided in the upstream side of the intake system, this vacuum wave is reflected as a positive pressure wave and moves back to the inlet port in the cylinder. By configuring the intake system so that this positive pressure wave reaches the inlet port just before the inlet valve closes, the air is more intensely forced into the combustion chamber, thereby improving the filling of the cylinder. Since the pressure wave moves with a certain velocity, in an invariable intake system it can bring about an optimum filling of the cylinder only within a certain rotational speed range. In order to achieve a good filing in several speed ranges, a plurality of individual air intake ducts are used, which can be opened and closed by a valve. By using different intake duct lengths, different pathways of the pressure wave are produced.

Ernst et al., U.S. Pat. No. 5,696,318 (=DE 19504382) discloses a switching unit for an air intake system with a plurality of inlet passages arranged side by side in an internal combustion engine which has two inlet passages for each cylinder, wherein one passage can be closed with a flap valve and the other passage is always open. The valve flaps of the closable inlet passages are mounted on a shaft which can be moved by a drive unit. All valves of the switching unit are mounted on the same shaft, so that the shaft cuts through each inlet passage, including the unswitched passages. As a result, leakage can occur between the switched and unswitched inlet passages which interferes with the filling effect of the vacuum wave. Another disadvantage of this system is that the shaft constitutes an interfering shape in the unswitched passages, disturbing the air flow and causing turbulence which adversely affects the filling of the cylinders.

SUMMARY OF THE INVENTION

The object of the invention is to provide a switching unit for shutting off intake passages in an air intake system, which allows no leakage between the switched and the unswitched flow cross sections.

Another object of the invention is to provide a switching unit which also avoids interfering shapes in the unswitched flow cross sections.

These and other objects have been achieved in accordance with the present invention by providing a switching unit for shutting off inlet passages in an air intake having a plurality of inlet passages arranged side by side in an internal combustion engine, the said inlet passages including at least two switched and unswitched flow cross sections, and wherein each switched flow cross section is provided with a flap valve and all flap valves are opened and closed by a single operating unit which runs outside of, i.e., does not pass through, the unswitched flow cross section.

The switching unit of the invention is advantageously capable of closing a plurality of flow cross sections in an air intake system with a plurality of inlet passages situated side by side in an internal combustion engine and opening them if necessary, while in the closed state no leakage occurs between the laterally adjacent flow cross sections, and the unswitched flow cross sections have no interfering shapes caused by the operating unit. The inlet passages of the intake system can be made in one piece or composed of several housing parts, welded or bolted together, for example.

The switching unit is an area of the intake system which has at least two switched and unswitched flow cross sections, flap valves, and an operating unit. The switched flow cross sections are the areas of the inlet passages in which flap valves are situated and the unswitched flow cross sections are the areas of the inlet passages which lie at the level of the switched flow cross sections but do not have any flap valves. A single operating unit serves to move all of the flaps. The operating unit can be formed, for example, by a single shaft or a plurality of flap valve shafts with a drive unit. The parts of the operating unit are always moved out of the switched flow cross section and operated outside of these flow cross sections. The unswitched cross sections have no contact at any point with the operating unit, so that no connection exists between the switched and unswitched flow cross sections and thus no leakage can occur. To prevent any leakage between the switched flow cross sections, the connection points must be sealed off, which can be done with a gasket, for example.

One advantageous embodiment of the invention comprises a valve flap with a multi-part construction. In this case the valve has at least two flap parts separate from one another, each mounted on a separate valve shaft. The valve shaft can be placed, for example, at an edge portion of the flap part, or be arranged in its center. In the case of a center location of the valve shaft, the shaft and the valve parts are situated in the controlled flow cross section both in the closed and in the open state. If the valve shaft is arranged in the edge areas, the valve parts can advantageously be streamlined so that the valve parts that remain in the switched flow cross section will cause a minimum air turbulence. Possible variants are bulges which narrow the switched flow cross section and widen it again without substantially varying or breaking the lines of flow.

One preferred embodiment of the invention provides for coupling the valve shafts together. The coupling of the valve shafts can be effected by means of a mechanical drive unit which is directly connected to the valve shafts, or by an electronic control of motors which drive the valve shafts. The valve flap shafts can either be counter-rotating, or they can be rotated in the same direction. If the valve shafts are counter-rotating, recesses for the valve parts need only be provided in one part of the intake passage, thereby simplifying the production of the intake passage. If the valve shafts rotate in the same direction, a compensation of the forces involved is achieved, since one valve part turns downwardly and the other upwardly.

In one specific embodiment, the valve parts and their operating units are removed out of the flow cross section when in the open state in order to thereby obtain a smoother flow. The valve parts can be retracted or turned out of the passage. When the valve parts are withdrawn from the switched flow cross section, care must be taken that no leakage occurs. This can be achieved by close tolerances. Another possibility for removing the valve from the flow cross section is to turn the valve parts into recesses provided for this purpose in the passage walls. This will avoid interfering structures and leakage between the switched flow cross sections.

According to another embodiment of the invention, sealing surfaces are provided on the flap valve. The sealing surfaces can seal the flap relative to the flow cross section as well as sealing the flap parts relative to one another. By means of smooth or offset surfaces, the flaps may produce a seal such as, for example, a labyrinth seal. Another possibility for producing sealing surfaces is to provide sealing material on the flap valve. The sealing surfaces are configured such that they seal the flow passage off depending on the particular state. In the closed state the flap valve seals the flow cross section and in the open state it seals the wall of the inlet passage. The use of gaskets at the sealing surfaces is another possibility for producing the sealing of the flap valve in the flow cross section.

One specific preferred embodiment of the invention provides for an offset arrangement of the switched flow cross sections from the unswitched flow cross sections. All switched cross sections lie on an axis so that the valves can be fastened on a single through-shaft so that all valves are operated synchronously. In this case a torsion-stiff material, such as aluminum, is to be chosen for the shaft. The unswitched flow cross sections can likewise lie on one axis, but attention must be given to providing a sufficient distance between the passage wall and the operating unit so as to avoid having any interfering shapes in the unswitched passage or excessively weakening the passage wall to prevent the wall from breaking in operation.

Since the inlet ports in the cylinder head are usually arranged in a row, it is advantageous to provide one switched and one unswitched flow cross section for a cylinder and bring them together ahead of the cylinder in one row lying on one axis. The combining of the two flow cross sections in one row before the cylinder head is a space-saving variant which permits a simple operation of the flaps with one shaft without having interfering shapes to impair air flow in the unswitched flow cross sections.

An advantageous embodiment of the inventive concept involves the operation of the flap valves with one drive unit. The drive unit is then part of the operating unit. In the case of one-piece flap valves, arranged for example on a single shaft, the shaft can be moved by the drive unit, thereby achieving special valve positions or movements. In the case of multi-part flap valves, the individual flap parts are connected together by the drive unit. Thus the flap parts can be operated through the drive unit by a single motor. The valve shafts can be operated in a given transmission ratio. With a transmission ratio not equal to 1:1, variant flows can be produced by having one flap part open faster or wider than the other flap part. Furthermore, drive units are conceivable which move the flaps in translation, whereby the valves are moved out of the flow cross section. For this purpose gear drives or lever drives could be used.

According to another embodiment of the invention, the flap can be placed in a short tube which surrounds the switched flow cross section. This tube is configured so that it can be installed as a preassembled unit into the air intake system and thus the flap can close or open the flow passage as a valve. In particular embodiments of the tube, it can form the entire switch means which can be installed as a preassembled module in the air intake system.

It is especially advantageous to produce the valve flaps and the tube by assembly injection molding, thereby gaining the advantages of assembly injection molding and achieving close tolerances and optimum fit so that virtually no leakage will occur.

One specific embodiment of the invention provides for the use of the switch unit in a substantially rectangular flow passage. The flap valves can then be journaled on integral pivot pins or on a shaft inserted in the edge areas. When the valve is opened the flap parts can be turned into recesses provided for them in the wall of the flow passage.

These and additional features of preferred embodiments of the invention will be found not only in the claims but also in the description and the drawings, the individual features being applicable individually or jointly in the form of subcombinations in embodiments of the invention and in other fields and may represent advantageous, independently patentable embodiments, for which protection is hereby claimed.

BRIEF DESCRIPTION OF THE DRAWINGS

The invention will described in further detail hereinafter with reference to illustrative preferred embodiments shown in the accompanying drawings in which.

DETAILED DESCRIPTION OF PREFERRED EMBODIMENTS

Figure 1:
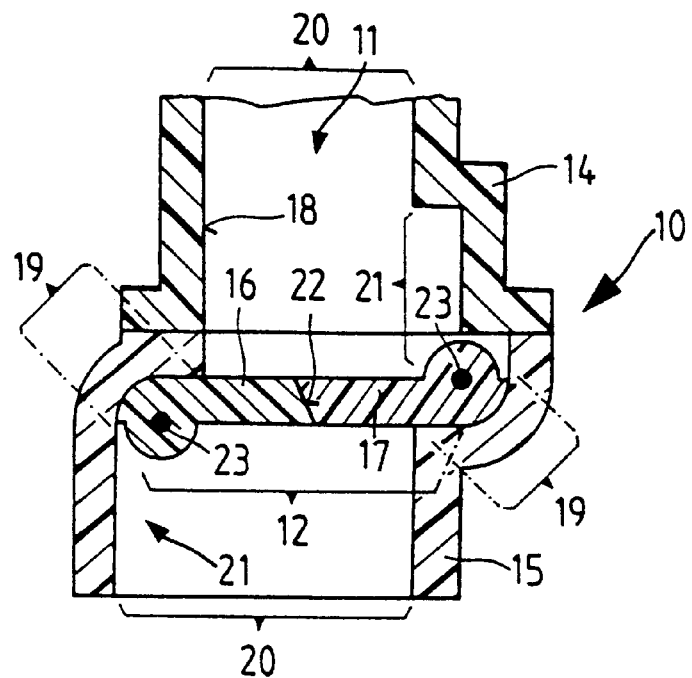
FIG. 1 shows a section through a closed oppositely moving switching unit.

In FIG. 1 a switching unit 10 is represented in a section taken through an inlet passage 11 in an air intake system in which several inlet passages 11 are arranged side by side (not shown). This switching unit 10 has substantially rectangular inlet passages 11, flap valves 12, flap shafts 23 and an operating unit 13 (not illustrated, see FIG. 4). The inlet passage 11 is formed from upper and lower passage sections 14 and 15. The flap valve 12 is formed by first and second flap parts 16 and 17, which are installed in the inlet passage 11. In this figure, the closed state is illustrated. The passage sections 14 and 15 each have a wall 18 in one piece at the circumference, which has bearing and sealing points 19 for the flap parts 16 and 17, and which surrounds a rectangular flow cross section 20 which is closed or opened by the flap valve 12. The wall 18 of the inlet passage 11 has recesses 21 into which the flap parts 16 and 17 can be turned so as to present no interfering shapes in the flow cross section 20. The switching unit 10 is so constructed that the flap parts 16 and 17 contact one another sealingly in the inlet passage 11 when in the closed position; for this purpose the flap parts 16 and 17 have beveled sealing surfaces 22. The flap parts 16 and 17 are installed at the bearing and sealing points 19 of the passage sections 14 and 15 such that no leakage occurs in these areas.

Figure 2:
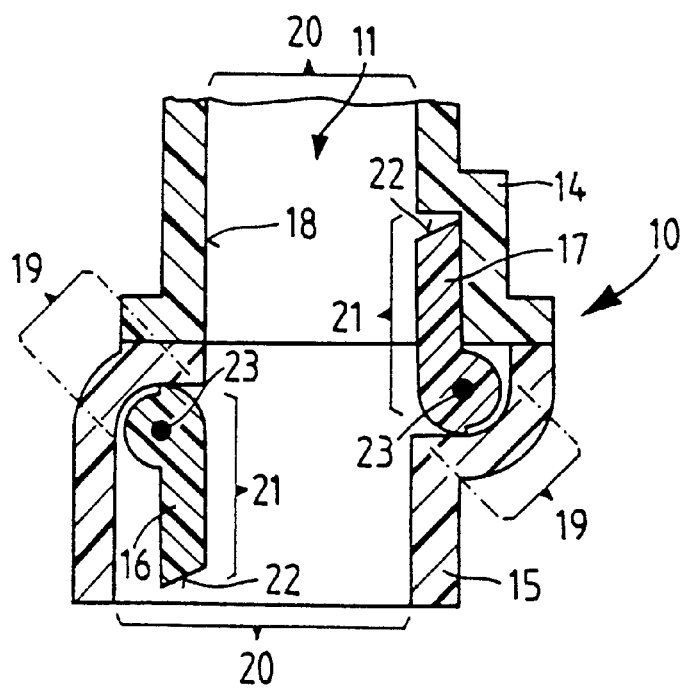
FIG. 2 shows a section through an open oppositely moving switching unit.

In FIG. 2 the switching unit 10 of FIG. 1 is illustrated in a sectional view in the open position. In this case the flap parts 16 and 17 are turned by rotating them in the same direction into the recesses 21 and are in contact with the wall 18. Thus no interfering structures are situated in the flow cross section 20 to interfere with the course of the lines of flow.

Figure 3:
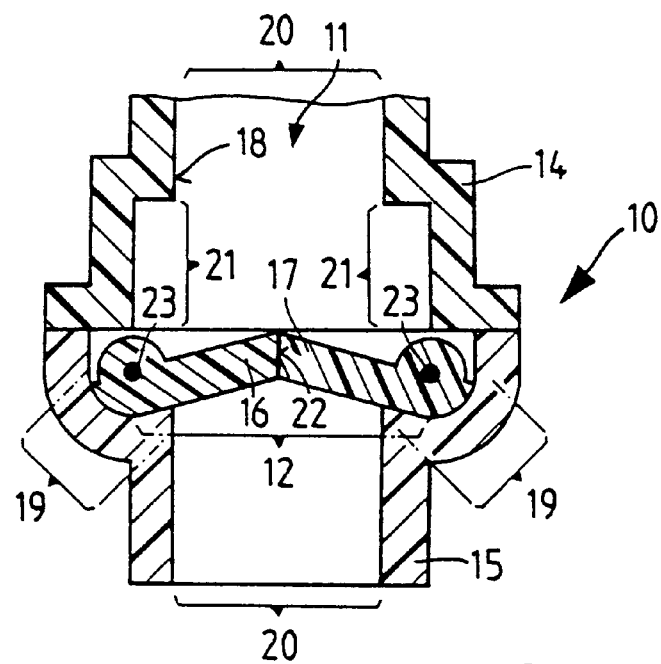
FIG. 3 shows a section through a closed switching unit with flaps working in the same direction.

In FIG. 3 the switching unit 10 with flap parts 16 and 17 turning in opposite directions is illustrated in a sectional view through an inlet passage 11. In this embodiment the recesses 21 for the flap parts 16 and 17 are made only in the upper passage section 14. The bearing and sealing points 19 of the flap parts 16 and 17, however, are situated in the lower passage section 15. In this embodiment the flap parts 16 and 17 are so designed that they self-lock together. When the flap 12 is closed, an ambient pressure acts on the flap parts 16 and 17 which forces them more strongly together and produces a more leak-proof flap valve 12. When flap 12 opens, the flap parts 16 and 17 are turned in contrary directions against the wall 18. Thus no interfering shapes are left in the flow cross section 20.

Figure 4:
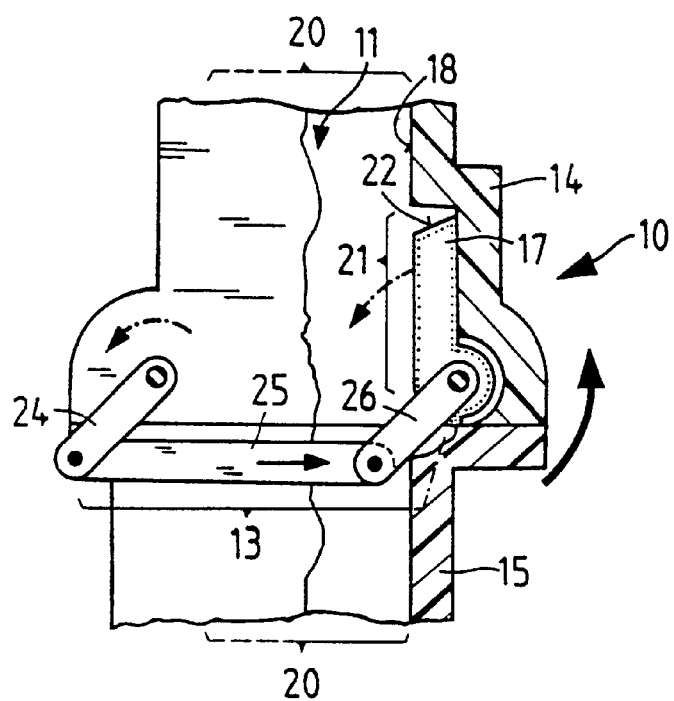
FIG. 4 shows a schematically represented operating unit.

In FIG. 4 an operating unit 13 is illustrated in a partially sectional view. This operating unit 13 produces the movement of flap parts 16 and 17 against one another by turning in the same direction (as in FIG. 2). The flap parts 16 and 17 are journaled in the bearing and sealing points 19 and connected with levers 24, 25 and 26. The operating unit 13 contains a short left lever 24, a long lever 25 and a short right lever 26. The left lever is connected to the first flap part 16 and the right lever arm 26 is connected to the second flap part 17. The two levers 24 and 26 are connected together by the long lever 25. The connection of the levers 24, 25, 26 is designed so that they can pivot relative to each other. By driving the operating unit 13 in the counterclockwise direction, the first and second valve parts 16 and 17 rotate counterclockwise. Such movement causes the flap parts 16 and 17 either to close the flow passage 11 or, by contacting the wall 18, to open the flow passage 11. Since the flap parts 16 and 17 move toward and away from one another the forces produced by the rotation are compensated, i.e., mutually offset.

Figure 5:
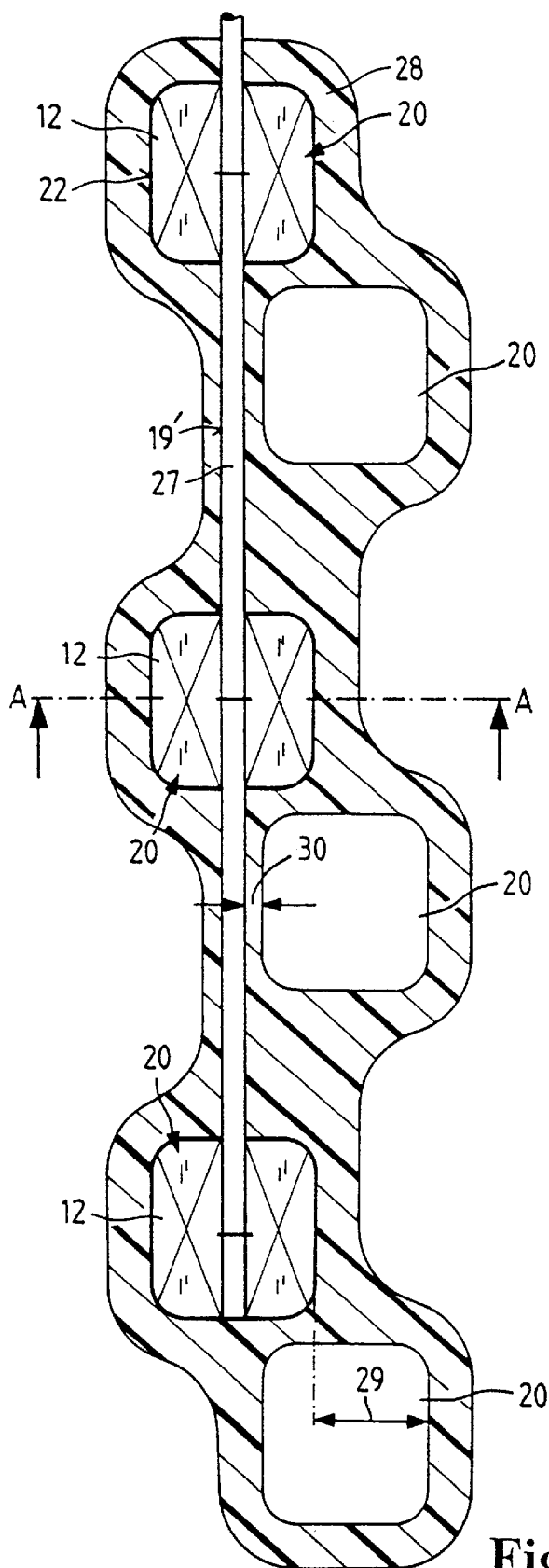
FIG. 5 shows a switching unit in section with passages offset from one another.

FIG. 5 shows a section through an air intake system which has flow cross sections 20 arranged offset from one another. The flaps 12 of the switched flow cross sections 20 are fastened on a single, through shaft 27. For this purpose the shaft 27 is inserted into the bearings 19' of an one-piece housing 28 made, for example, by casting. Then the flaps 12 are fastened to the shaft 27, for example, by laser welding. The flaps 12, however, can also be fastened to the shaft 27 by riveting or screwing. The bearings 19' are designed so that no leakage takes place between the switched flow cross sections 20. In different embodiments, seals are mounted on the shaft 27 in these areas. The unswitched flow cross sections 20 have no interfering shapes produced by the shaft 27 or flaps 12. The offset flow cross sections 20 can be extended to the cylinders in the offset arrangement without bringing them together. In such a case it is then necessary to adapt the cylinder head flange to the configuration of the intake system.

Figure 6:
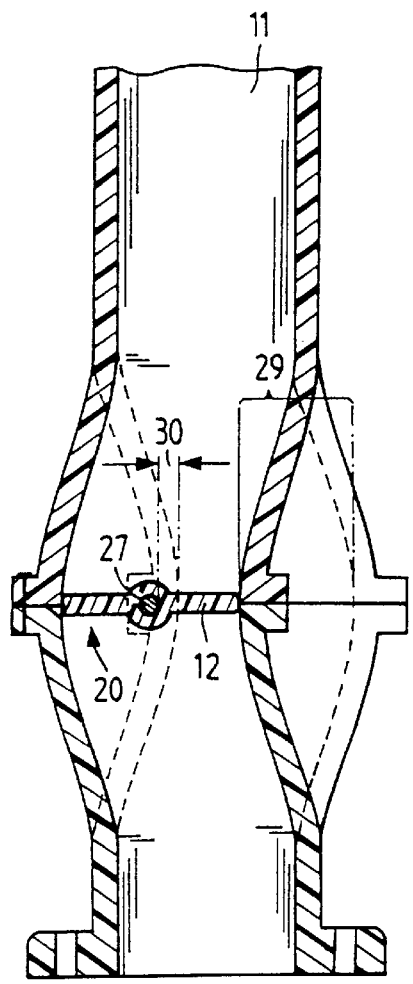
FIG. 6 shows a switching unit in section.

In FIG. 6 the switching unit is illustrated in a section taken along line A—A according to FIG. 5. The section runs along an inlet passage 11 with flow cross sections 20 offset from one another. In this embodiment the initially parallel inlet passages 11 divide into an offset arrangement in the area of the flaps 12. In the area of the flaps 12 there is the greatest offset 29 between the switched and the unswitched flow cross sections 20. The offset 29 of the flow cross sections 20 is made just large enough that the shaft 27 is extended past the unswitched cross section 20 without intersecting it, but sufficient wall thickness 30 must be provided to prevent any breakthrough of the shaft 27 in operation. The inlet passages 11 are brought back parallel together again in the area of the flaps 12, without requiring any adaptation of the cylinder head flange. The transition from the parallel inlet passages 11 to the offset arrangement is accomplished in flow-optimized curves, so that the lines of flow of the air are hardly affected at all.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. A switching unit for shutting off inlet passages in an air intake system having a plurality of inlet passages arranged side by side in an internal combustion engine, said inlet passages including at least two switched and unswitched flow cross sections, wherein the switched flow cross sections are each provided with a flap valve and all of the flap valves are opened and closed by a single operating unit which runs outside of the unswitched flow cross section, and wherein the flap valve comprises at least two separate flap parts, each of which is mounted on a respective flap valve shaft.

2. A switching unit according to claim 1, wherein the flap valve shafts are coupled together with respect to the flap position.

3. A switching unit according to claim 1, wherein the flap valve is operated by a drive unit which comprises part of the operating unit.

4. A switching unit according to claim 1, wherein the flap valve is placed in a short tube, which tube is inserted in the air intake of the engine and surrounds the flow cross section.

5. A switching unit according to claim 1, wherein the flap valve and the short tube are assembly injection molded parts.

6. A switching unit according to claim 1, wherein the flap valve is inserted in a substantially rectangular flow cross section.

7. A switching unit for shutting off inlet passages in an air intake system having a plurality of inlet passages arranged side by side in an internal combustion engine, said inlet passages including at least two switched and unswitched flow cross sections, wherein the switched flow cross sections are each provided with a flap valve and all of the flap valves are opened and closed by a single operating unit which runs outside of the unswitched flow cross section, and wherein the flap valve is positioned outside of the flow cross section when in an open position.

8. A switching unit according to claim 7, wherein the flap valve is operated by a drive unit which comprises part of the operating unit.

9. A switching unit according to claim 7, wherein the flap valve is placed in a short tube, which tube is inserted in the air intake of the engine and surrounds the flow cross section.

10. A switching unit according to claim 7, wherein the flap valve and the short tube are assembly injection molded parts.

11. A switching unit according to claim 7, wherein the flap valve is inserted in a substantially rectangular flow cross section.

12. A switching unit for shutting off inlet passages in an air intake system having a plurality of inlet passages arranged side by side in an internal combustion engine, said inlet passages including at least two switched and unswitched flow cross sections, wherein the switched flow cross sections are each provided with a flap valve and all of the flap valves are opened and closed by a single operating unit which runs outside of the unswitched flow cross section, and wherein the flap valve is provided with sealing surfaces.

13. A switching unit according to claim 12, wherein the flap valve is operated by a drive unit which comprises part of the operating unit.

14. A switching unit according to claim 12, wherein the flap valve is placed in a short tube, which tube is inserted in the air intake of the engine and surrounds the flow cross section.

15. A switching unit according to claim 12, wherein the flap valve and the short tube are assembly injection molded parts.

16. A switching unit according to claim 12, wherein the flap valve is inserted in a substantially rectangular flow cross section.

17. A switching unit for shutting off inlet passages in an air intake system having a plurality of inlet passages arranged side by side in an internal combustion engine, said inlet passages including at least two switched and unswitched flow cross sections, wherein the switched flow cross sections are each provided with a flap valve and all of the flap valves are opened and closed by a single operating unit which runs outside of the unswitched flow cross section, and wherein the switched flow cross sections are arranged offset from the unswitched flow cross sections.

18. A switching unit according to claim 17, wherein one switched flow cross section and one unswitched flow cross section are provided for each cylinder of the internal combustion engine.

19. A switching unit according to claim 17, wherein the flap valve is operated by a drive unit which comprises part of the operating unit.

20. A switching unit according to claim 17, wherein the flap valve is placed in a short tube, which tube is inserted in the air intake of the engine and surrounds the flow cross section.

21. A switching unit according to claim 17, wherein the flap valve and the short tube are assembly injection molded parts.

22. A switching unit according to claim 17, wherein the flap valve is inserted in a substantially rectangular flow cross section.

* * * * *